United States Patent
Stephens

(10) Patent No.: US 11,930,737 B2
(45) Date of Patent: Mar. 19, 2024

(54) SELF-PROPELLED WINDROWER WITH YIELD MONITORING BASED ON MERGER LOAD

(71) Applicant: CNH Industrial America LLC, New Holland, PA (US)

(72) Inventor: Zachary Stephens, Howard, PA (US)

(73) Assignee: CNH Industrial America LLC, New Holland, PA (US)

( * ) Notice: Subject to any disclaimer, the term of this patent is extended or adjusted under 35 U.S.C. 154(b) by 236 days.

(21) Appl. No.: 16/726,448

(22) Filed: Dec. 24, 2019

(65) Prior Publication Data

US 2021/0185914 A1    Jun. 24, 2021

(51) Int. Cl.
| | | |
|---|---|---|
| *A01D 41/127* | (2006.01) | |
| *A01D 41/04* | (2006.01) | |
| *A01D 41/06* | (2006.01) | |
| *A01D 61/00* | (2006.01) | |

(52) U.S. Cl.
CPC ......... *A01D 41/1271* (2013.01); *A01D 41/04* (2013.01); *A01D 41/06* (2013.01); *A01D 61/00* (2013.01)

(58) Field of Classification Search
CPC .... A01D 41/1271; A01D 41/06; A01D 41/04; A01D 61/00; A01D 41/127; A01D 43/085
See application file for complete search history.

(56) References Cited

U.S. PATENT DOCUMENTS

| | | | |
|---|---|---|---|
| 6,066,809 A * | 5/2000 | Campbell | G01G 11/003 177/119 |
| 6,185,990 B1 * | 2/2001 | Missotten | A01B 79/005 324/691 |
| 6,584,424 B2 | 6/2003 | Hardt | |
| 6,616,527 B2 * | 9/2003 | Shinners | A01F 29/09 460/6 |
| 6,751,515 B2 * | 6/2004 | Moore | A01B 79/005 56/10.2 C |
| 7,028,459 B2 * | 4/2006 | Lohrentz | A01D 57/20 56/192 |
| 7,096,653 B2 | 8/2006 | Shinners et al. | |
| 7,921,626 B2 * | 4/2011 | Maertens | A01D 41/1276 56/10.2 R |
| 8,347,709 B2 * | 1/2013 | Kormann | G01F 13/003 73/272 R |
| 9,078,397 B2 * | 7/2015 | Farley | A01F 12/44 |

(Continued)

*Primary Examiner* — Thomas B Will
*Assistant Examiner* — Madeline I Runco
(74) *Attorney, Agent, or Firm* — Peter K. Zacharias

(57) ABSTRACT

A merger system for an agricultural vehicle includes: at least one frame mount configured to couple to a chassis; a movable merger frame coupled to the at least one frame mount; a conveyor supported by the merger frame and configured to convey crop material; at least one load sensor associated with the at least one frame mount and configured to output load signals corresponding to a mass of the merger frame; and a controller operatively coupled to the at least one load sensor. The controller is configured to: determine a mass of crop material conveyed by the conveyor based at least partially on the mass of the merger frame; determine a crop yield based at least partially on the determined mass of crop material; and output a yield signal corresponding to the determined crop yield.

15 Claims, 4 Drawing Sheets

(56) References Cited

U.S. PATENT DOCUMENTS

| | | |
|---|---|---|
| 9,152,938 B2 | 10/2015 | Lang et al. |
| 9,410,840 B2 | 8/2016 | Acheson et al. |
| 9,506,786 B2 | 11/2016 | Strnad et al. |
| 9,625,306 B2* | 4/2017 | Farley .................. A01F 12/385 |
| 9,668,420 B2 | 6/2017 | Anderson et al. |
| 9,870,654 B2 | 1/2018 | Tanabe et al. |
| 10,188,037 B2* | 1/2019 | Bruns ................ A01D 41/1273 |
| 10,318,138 B2* | 6/2019 | Scholer ............. A01D 41/1277 |
| 10,473,496 B2* | 11/2019 | Misra ........................ G01F 1/30 |
| 10,542,674 B2* | 1/2020 | Digman ................. A01D 57/20 |
| 10,813,287 B2* | 10/2020 | Rotole ................. A01D 41/127 |
| 10,820,504 B2* | 11/2020 | Borsdorf ................ A01F 12/10 |
| 10,820,516 B2* | 11/2020 | Farley ............... A01D 41/1271 |
| 10,827,667 B2* | 11/2020 | Kirk ..................... A01D 89/006 |
| 2013/0124239 A1* | 5/2013 | Rosa ...................... A01D 46/00 |
| | | 705/7.11 |
| 2016/0071223 A1* | 3/2016 | Rupp ................ A01D 41/1274 |
| | | 705/7.11 |
| 2018/0295767 A1* | 10/2018 | Friemel ............. A01B 63/104 |
| 2018/0325032 A1* | 11/2018 | Rotole .................... G05D 3/12 |
| 2019/0327897 A1* | 10/2019 | McKinnis, Jr. ........ A01D 57/20 |
| 2021/0034867 A1* | 2/2021 | Ferrari ................ G05D 1/0236 |

* cited by examiner

SELF-PROPELLED WINDROWER WITH YIELD MONITORING BASED ON MERGER LOAD

FIELD OF THE INVENTION

The present invention pertains to agricultural vehicles and, more specifically, to self-propelled windrowers.

BACKGROUND OF THE INVENTION

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Current practice in agriculture is to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as baling.

More current practice is to combine multiple windrows together as they are being mowed. This practice eliminates a raking operation and also reduces the number of passes of subsequent harvesting operations (e.g., chopping and baling). With the advent of higher capacity forage harvesters and balers, merging windrows is become a more desirable practice. Windrow merging attachments are thus becoming more prevalent on harvesting machines.

While cutting the crop, it is difficult for an operator to get a real time, accurate estimation of the yield. Many estimation techniques rely on algorithms that make assumptions based on vehicle parameters, such as ground speed and header width, that do not account for variables such as crop density.

What is needed in the art is a self-propelled windrower that can address some of the previously described issues with known windrowers.

SUMMARY OF THE INVENTION

Exemplary embodiments disclosed herein provide an agricultural vehicle with a controller that is configured to determine a crop yield based at least partially on a mass of crop material conveyed by a conveyor that is determined based on a mass of a merger frame supporting the conveyor.

In some exemplary embodiments provided according to the present disclosure, a merger system for an agricultural vehicle includes: at least one frame mount configured to couple to a chassis; a movable merger frame coupled to the at least one frame mount; a conveyor supported by the merger frame and configured to convey crop material; at least one load sensor associated with the at least one frame mount and configured to output load signals corresponding to a mass of the merger frame; and a controller operatively coupled to the at least one load sensor. The controller is configured to: determine a mass of crop material conveyed by the conveyor based at least partially on the mass of the merger frame; determine a crop yield based at least partially on the determined mass of crop material; and output a yield signal corresponding to the determined crop yield.

In some exemplary embodiments provided according to the present disclosure, an agricultural vehicle includes: a chassis; a merger system carried by the chassis, the merger system having a movable merger frame suspended from the chassis, a conveyor supported by the merger frame and configured to convey crop material, and at least one frame mount coupling the movable frame to the chassis; at least one load sensor associated with the at least one frame mount and configured to output load signals corresponding to a mass of the merger frame; and a controller operatively coupled to the at least one load sensor. The controller is configured to: determine a mass of crop material conveyed by the conveyor based at least partially on the mass of the merger frame; determine a crop yield based at least partially on the determined mass of crop material; and output a yield signal corresponding to the determined crop yield.

In some embodiments, a method of determining a yield of an agricultural vehicle traveling across a field is provided. The method is performed by a controller and includes: conveying collected crop material with a conveyor; determining a mass of crop material conveyed by the conveyor based at least partially on a mass of a merger frame supporting the conveyor during conveying; determining a crop yield based at least partially on the determined mass of crop material; and outputting a yield signal corresponding to the determined crop yield.

One possible advantage that may be realized by exemplary embodiments disclosed herein is that the controller determining the mass of crop material conveyed by the conveyor based on the mass of the merger frame provides a relatively easy and accurate measurement of crop material collection without interfering with crop flow.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
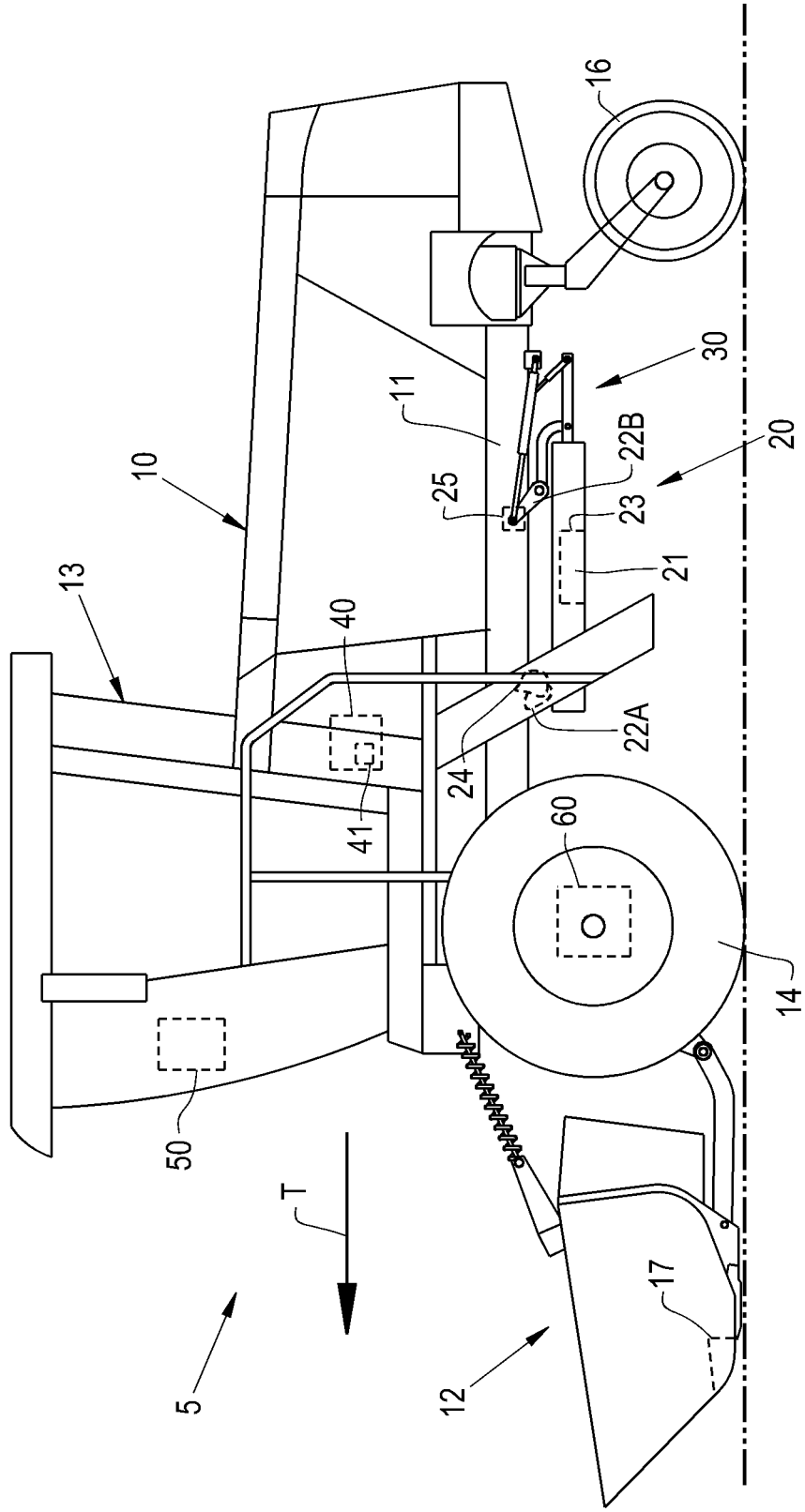
FIG. 1 illustrates a side view of an exemplary embodiment of an agricultural vehicle in the form of a self-propelled windrower, provided in accordance with the present disclosure.

Referring now to the drawings, and more particularly to FIG. 1, a side view of a typical self-propelled windrower 5 used for harvesting a crop material as it travels across the ground in the direction indicated by arrow "T." Usually, a tractor 10 pushes a header 12 which severs the crop material from the ground, usually by a sickle-bar, rotary cutter or other functionally equivalent cutter. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutter 17 in the leading edge of the header 12 and falls rearwardly into the header 12. The crop material is urged toward the center of the header 12 where it may be conditioned prior to discharge from the header 12. The crop is then ejected rearwardly from the header 12, generally in the space between the drive wheels 14 whereupon it falls to the ground. Shields (not shown) are used to arrange the crop into a windrow that is formed generally along the longitudinal axis of the windrower 5.

Windrower 5 also includes a merger system 20 which is disposed under chassis 11 for directing crop material being discharged from header 12 to a location laterally displaced from the longitudinal centerline of the windrower 5. In this manner, windrows of harvested crop material may be positioned for merging with the harvested crop material from a previous separate pass by the windrower 5, usually when the windrower 5 travels in the opposite direction along an adjacent path.

The merger system 20 includes a movable merger frame 21 coupled to the chassis 11 by one or more frame mounts, illustrated as front frame mounts 22A and rear frame mounts 22B. In some embodiments, a single frame mount is provided to couple the merger frame 21 to the chassis 11. As can be appreciated from FIG. 1, the merger frame 21 may be suspended from the chassis 11. The merger frame 21 supports a conveyor 23, which may be an endless conveyor comprising a belt, that is configured to convey crop material, as will be described further herein.

In some embodiments, a lift mechanism 30, which may include an actuator, is coupled to the merger frame 21 to raise and lower the merger frame 21 to selectively position the merger system 20 in a working position for windrow merging operation, and also in a non-working position for forming windrows that trail behind generally along the windrower longitudinal centerline.

Figure 2A:
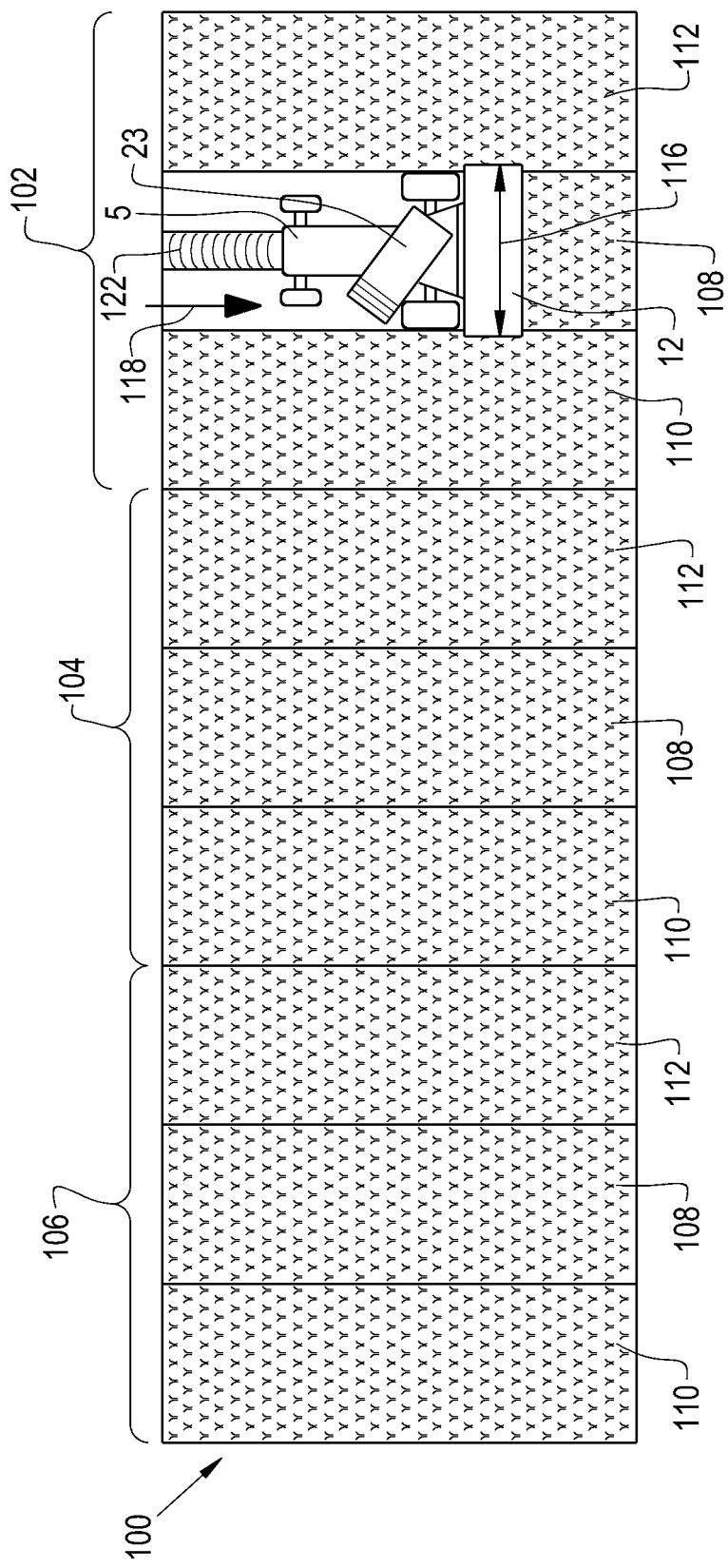
FIG. 2A illustrates a top view of the windrower of FIG. 1 operating in a field to form a windrow.

FIG. 2A illustrates a field 100 of standing crop materials during performance of the harvesting operation with the windrower 5, with the standing materials being generally indicated by the cross-hatching contained within the schematic view of the field 100. For purposes of describing aspects of the disclosed method, the field 100 is illustrated as being divided into a plurality of "triple windrow sets", with each triple windrow set including three adjacent sections or strips of the field 100. As such, when the standing crop material of the three adjacent field strips of each triple windrow set is cut using the windrower 5, the severed material may be merged or deposited together to form a triple windrow. It should be appreciated, however, that only two merged windrows are illustrated herein for exemplary purposes. For instance, FIG. 2A illustrates three separate triple windrow sets (i.e., a first triple windrow set 102, a second triple windrow set 104, and a third triple windrow set 106), with each triple windrow set 102, 104, 106 including a central field strip 108 and first and second side field strips 110, 112 disposed along either side of the central field strip 108. As will be described in greater detail below, the central field strip 108 of a given triple windrow set 102, 104, 106 may be cut initially by the windrower 5 to create an initial deposit of severed materials along such central field strip 108. Thereafter, following one or more intermediate cutting passes along other portions of the field 100, the first and second side field strips 110, 112 may be cut and deposited onto and/or adjacent to the initial deposit of several materials to create a triple windrow along the central field strip 108.

It should be appreciated that FIG. 2A simply illustrates a portion of the above-described field 100. Thus, one of ordinary skill in the art will readily appreciate that, although only three triple windrow sets 102, 104, 106 are shown in FIG. 2A (along with the nine associated field strips 108, 110, 112), the field 100 may generally include any number of triple (or single or double) windrow sets and associated field strips. It should also be appreciated that each field strip 108, 110, 112 may generally define a width corresponding to a width 116 (FIG. 2A) of the header 12 of the windrower 5. Thus, as the windrower 5 makes each cutting pass across the field 100 along a centerline of each field strip 108, 110, 112, the standing materials contained within such field strip may be severed from the ground and subsequently deposited onto the ground to form a windrow.

When initiating the harvesting operation, the windrower 5 may make an initial or first cutting pass along the central field strip 108 of one of the triple windrow sets in a first harvesting direction (e.g., as indicated by arrow 118 in FIG. 2A). For instance, as shown in FIG. 2A, the windrower 5 may be configured to initially cut the standing crop material contained within the central field strip 108 of the first triple windrow set 102. In such instance, the header 12 of windrower 5 may be aligned with the central field strip 108 directly between the first and second side strips 110, 112 of the first triple windrow set 102 while the conveyor 23 of the windrower 5 may be located at its raised position to allow the severed crop material to be deposited onto the ground directly below the windrower 5 along its longitudinal centerline. Thus, as the windrower 5 moves across the central field strip 108 of the first triple windrow set 102 in the first harvesting direction 118, the header 12 may sever the crop material from the ground and project the severed material rearwardly underneath the raised conveyor 23. As such, the severed materials may fall onto the ground to form a first windrow or deposit of severed materials 122 extending behind the windrower 5 along the central field strip 108 of the first triple windrow set 102.

Figure 2B:
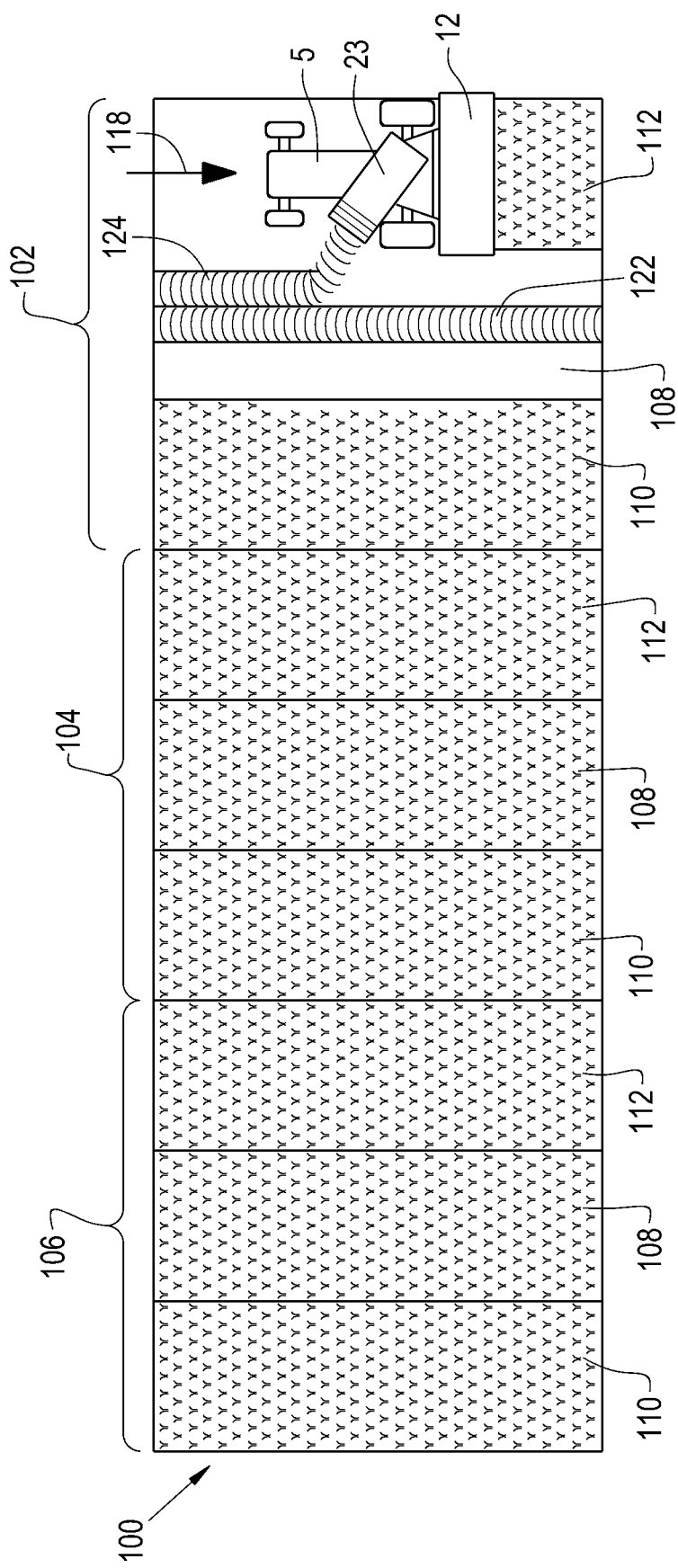
FIG. 2B illustrates a top view of the windrower of FIGS. 1 and 2A operating in a field to form a windrow that is merged with the windrow illustrated in FIG. 2A.

Upon completion of the first cutting pass, the windrower 5 may be turned around to allow a second cutting pass to be made across the field 100 in the first harvesting direction 118. In some embodiments, the second cutting pass may be made across one of the side field strips 110, 112 of the first triple windrow set 102 (e.g., depending on which side of the windrower 5 that the conveyor 23 is configured to deposit materials). For example, as shown in FIG. 2B, the second cutting pass is being made across the second side field strip 112 of the first triple windrow set 102 due to the conveyor 23 being configured to laterally deposit several crop material along the right side of the windrower 5. However, if the conveyor 23 was, instead, configured to laterally deposit severed crop material along the left side of the windrower 5, the second cutting pass may, for example, be made across the first side field strip 110 of the first triple windrow set 102. Regardless, when making the second cutting pass, the conveyor 23 may be moved to its lowered or working position. Thus, as the windrower 5 moves across the side field strip 112 of the first triple windrow set 102 in the first harvesting direction 118, the header 12 may sever the crop material from the ground and project the severed material rearwardly onto the conveyor 23 of the merger system 20. As shown in FIG. 2B, the severed crop material may then be conveyed laterally to the side of the windrower 5 via the conveyor 23 and deposited into the central field strip 108 of the first triple windrow set 102, thereby creating a second windrow or deposit of severed materials 124 within the central field strip 108 of the first triple windrow set 102 that is located on top of and/or adjacent to the first deposit of severed materials 122.

In known windrowers, it is difficult to reliably measure a crop yield during operation. This is due to a variety of factors, including non-homogeneity of crop density in the field, differing speeds of operation across the field, etc. While some solutions have been tried for predicting crop yield, many of the solutions are inaccurate because they rely on algorithms that make many assumptions or are cumbersome because they interfere with crop material collection. For these reasons, accurate crop yield measurements are typically not obtained until all of the crop is cut, collected, and weighed.

To address some of the previously described issues with known windrowers, and referring again to FIG. 1, the merger system 20 provided according to the present disclosure has one or more load sensors, illustrated as a front load sensor 24 and a rear load sensor 25, associated with the one or more frame mounts 22A, 22B coupling the merger frame 21 to the chassis 11. Each of the load sensors 24, 25 is configured to output load signals that correspond to a mass of the merger frame 21. The load sensor(s) 24, 25 may be any type of sensor that is capable of measuring a load at the frame mount(s) 22A, 22B to measure the mass of the merger frame 21, with many such sensors being known. In some embodiments, each of the frame mounts 22A, 22B may have a respectively associated load sensor 24, 25 so the load sensors 24, 25 can sense the load at each frame mount 22A, 22B.

The load sensor(s) 24, 25 are operatively coupled to a controller 40. The controller 40 may be, for example, a central tractor controller that controls various functions of the tractor 10 or, alternatively, an application specific controller that controls the merger system 20. In some embodiments, the controller 40 is also operatively coupled to the conveyor 23, as will be described further herein. The controller 40 includes a memory 41 that can store machine code that is used by the controller 40 to control various functions. The controller 40 is configured to determine a mass of crop material conveyed by the conveyor 23 based at least partially on the mass of the merger frame 21, determine a crop yield based at least partially on the determined mass of crop material, and output a yield signal corresponding to the determined crop yield.

The controller 40 is configured to determine a mass of crop material conveyed by the conveyor 23 based at least partially on the mass of the merger frame 21. The controller 40 can determine the mass of crop material based on received signals from the load sensor(s) 24, 25, which correspond to the mass of the merger frame 21. In some embodiments, the controller 40 is configured to "zero" the determined mass to account for the mass of the merger frame 21 and the conveyor 23 being suspended from the chassis 11, so the controller 40 determines only the mass of crop material being conveyed by the conveyor 23. Various ways of zeroing the mass of load sensors are known, so further description is omitted for brevity. When multiple load sensors 24, 25 are included, the controller 40 can be configured to determine the mass at each load sensor 24, 25, which can correspond to the mass supported by each frame mount 22A, 22B, and determine the sum of the determined masses to determine the mass of the merger frame 21.

In some embodiments, the controller 40 is configured to determine the mass of crop material at a defined frequency. Determining the mass of crop material at a defined frequency, rather than continuously, can reduce the amount of computing power used to determine the mass. For example, the controller 40 may be operatively coupled to the conveyor 23 and configured to set a conveyance speed of the conveyor 23. The conveyance speed defines a time period for performing an unload cycle, i.e., how long it takes for the conveyor 23 to unload an entire conveyor's worth of crop. The time period may correspond to, in the case of an endless belt conveyor, how long it takes for the conveyor 23 to rotate half of the belt. If, for example, it takes the conveyor 23 five seconds to unload an entire load of the crop material that is delivered to the conveyor 23, the controller 40 can set the time period to be five seconds. The defined frequency can also be equal to the set time period (five seconds) so the controller 40 determines the mass of crop material every five seconds. By determining the mass at a frequency of the defined time period, the controller 40 determines the mass of the merger frame 21 as crop material is re-supplied to the conveyor 23, which can maintain the accuracy of the determination while reducing the computing power needed.

After determining the mass of crop material conveyed by the conveyor 23, the controller 40 determines a crop yield based at least partially on the determined mass of crop material that is conveyed. Since any crop material that is conveyed by the conveyor 23 originates from the field, the mass of crop material conveyed by the conveyor 23 corresponds to the mass of crop material collected by the windrower 5 while the conveyor 23 is in the working position. In some embodiments, the controller 40 is configured to account for harvesting when the conveyor 23 is not in the working position, as will be described further herein.

The controller 40 can be configured to determine the crop yield in a variety of ways. For example, the controller 40 can be configured to determine the total mass of crop material conveyed by the conveyor 23 and divide that amount by a known area, which may be input to the controller 40 by an operator or determined by the controller 40 based on various parameters. If, for example, the operator inputs to the controller 40 that the harvested acreage is 2000 acres and the total mass of the crop material conveyed by the conveyor 23 is 5000 tons, the controller 40 can determine that the crop yield is approximately 2.5 tons per acre. It should be appreciated that the controller 40 can determine the crop yield as a variety of units, including tons per acre, bushels per acre, etc.

The previous calculation assumes that the conveyor 23 is in the working position during the entirety of the collection. The controller 40 can be configured to determine, for example, when the conveyor 23 is not in the working position and take this into account when determining the crop yield. For example, when the windrower 5 is being used to form double windrows, the controller 40 may be configured to account for the conveyor 23 only being in the working position for half of the collection by either using half of the harvested acreage or doubling the determined mass of crop material conveyed by the conveyor 23. For triple windrows, the controller 23 can be similarly configured to use two-thirds of the harvested acreage or multiply the determined mass of crop material conveyed by the conveyor 23 by three-halves to account for the conveyor 23 being in the working position for two windrows to each windrow when the conveyor 23 is not in the working position. Thus, it should be appreciated that the controller 40 can be configured in a variety of ways to account for times when the conveyor 23 is not in the working position.

Alternatively or in addition to using the area based on operator input, the controller 40 can be configured to determine an area harvested to assist in determining the cut field. For example, the controller 40 may receive input from an operatively coupled speed sensor 60 to determine the ground speed of the windrower 5, which corresponds to a ground speed of the merger frame 21, and determine the area based on the ground speed. The controller 40 can also be configured to determine the area harvested based at least partially on a working width 116 of the header 12 and/or a conveyance speed of the conveyor 23. It should thus be appreciated that the controller 40 may take into account different variables, in addition to the mass of the merger frame 21, to determine the crop yield.

Figure 3:
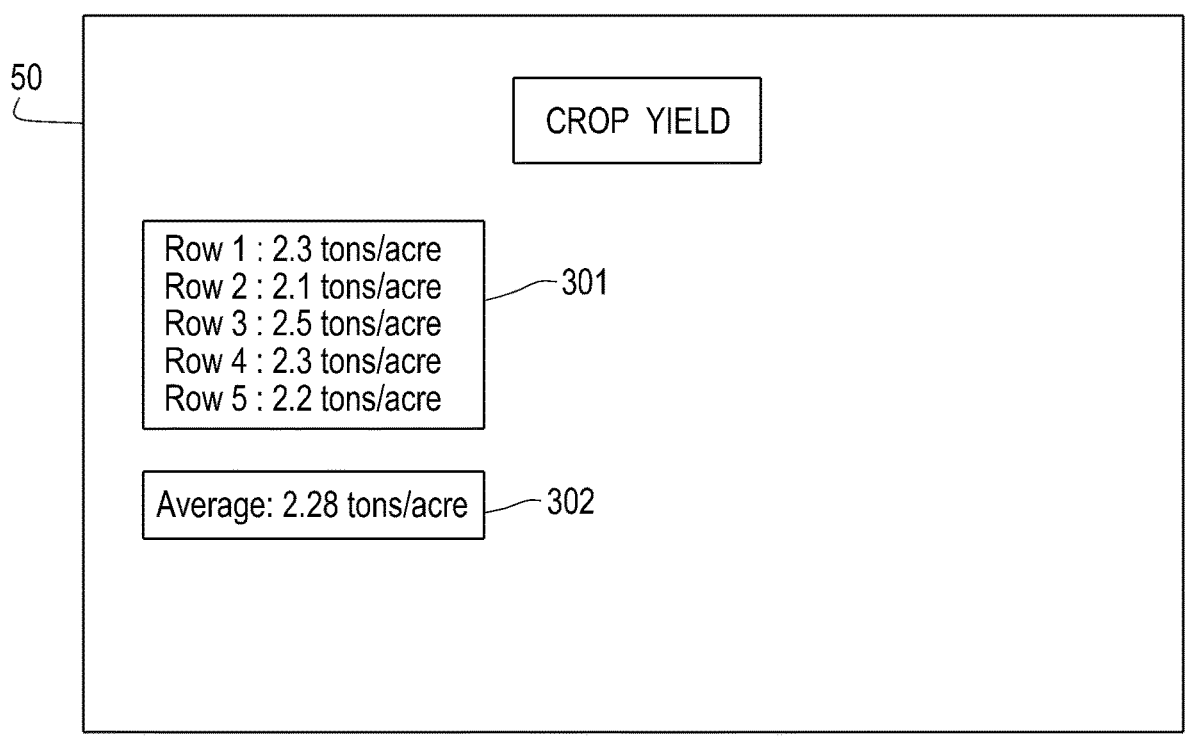
FIG. 3 illustrates an exemplary embodiment of a graphical user interface that may be presented on a display of the windrower of FIG. 1.

After determining the crop yield, the controller 40 outputs a yield signal corresponding to the determined crop yield. The controller 40 may output the yield signal to, for example, a display 50 placed in the operator cab 13 that causes the display 50 to display the determined crop yield, as illustrated in FIG. 3. In some embodiments, the controller 40 is configured to determine the crop yield for each individual row or strip 108, 110, 112 of the field 100 and output a corresponding yield signal to the display 50 so the display 50 displays a row crop yield icon 301 with the determined crop yield for each row. In addition, the controller 40 may be configured to determine the crop yield as a running average for the entire field 100 and output a corresponding yield signal to the display 50 so the display 50 displays a field crop yield icon 302 with the determined crop yield running average. It should thus be appreciated that the controller 40 can output various types of yield signals, depending on the determined crop yield, to provide an operator with real-time data concerning the crop yield.

From the foregoing, it should be appreciated that the merger system 20 provided according to the present disclosure allows for accurate, real-time monitoring of the crop yield that does not interfere with crop collection. Accurate mass measurements of the collected crop material may be determined by determining the mass of the merger frame 21, which supports the conveyor 23 that conveys the collected crop material. Due to the placement of the load sensor(s) 24, 25 at the frame mount(s) 22A, 22B, the mass measurement of the merger frame 21 does not interfere with crop collection. Measuring the mass of the merger frame 21 also provides an actual measurement of the crop material that is collected, rather than utilizing an algorithm based on header width and ground speed, which may be inaccurate in instances where an entire width of the header is not cutting crop material. Therefore, the merger system 20 provided according to the present disclosure can accurately monitor crop yields in real time while avoiding many of the issues that are present in known systems.

Figure 4:
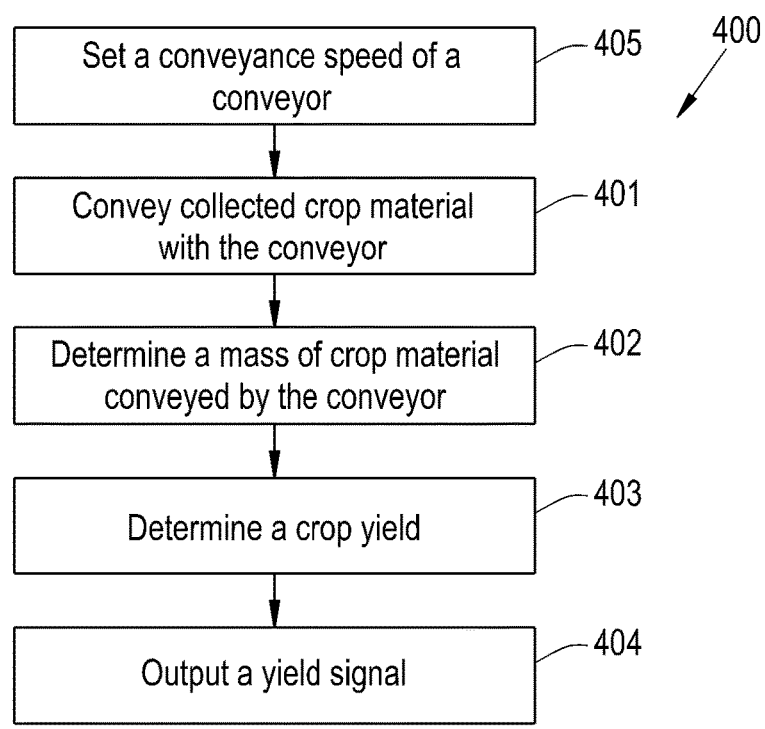
FIG. 4 is a flow chart illustrating an exemplary embodiment of a method of determining a yield of an agricultural vehicle traveling across a field, provided in accordance with the present disclosure.

Referring now to FIG. 4, an exemplary embodiment of a method 400 of determining a yield of an agricultural vehicle 5 traveling across a field 100 provided according to the present disclosure is illustrated. The method 400 is performed by a controller, such as the previously described controller 40, and includes conveying 401 collected crop material with a conveyor 23, determining 402 a mass of crop material conveyed by the conveyor 23 based at least partially on a mass of a merger frame 21 supporting the conveyor 23 during conveying 401, determining 403 a crop yield based at least partially on the determined mass of crop material, and outputting 404 a yield signal corresponding to the determined cut yield. The vehicle 5 may comprise, for example, a plurality of frame mounts 22A, 22B coupling the merger frame 21 to a chassis 11 of the vehicle 5 and a plurality of load sensors 24, 25 operatively coupled to the controller 40. Each of the load sensors 24, 25 may be associated with a respective one of the frame mounts 22A, 22B so the load sensors 24, 25 output load signals corresponding to a load experienced at each mounting point of the frame mounts 22A, 22B to the chassis 11, which may be used by the controller 40 to determine 402 the mass of crop material conveyed by the conveyor 23.

In some embodiments, the crop yield is determined 403 based on the determined mass of crop material as well as other inputs. The additional inputs may be, but are not limited to, a ground speed of the merger frame 21, which corresponds to a ground speed of the vehicle 5, a conveyance speed of the conveyor 23, and/or a working width 116 of a header 12 of the vehicle 5. Alternatively, the crop yield may be determined 403 based on the determined mass of crop material as well as an operator input, such as a harvested acreage, that the controller 40 uses to determine the crop yield. The crop yield may be determined 403 in tons per acre, as previously described, or in other units, such as bushels per acre.

In some embodiments, the yield signal is output 404 to a display 50 that is disposed in an operator cab 13 of the vehicle 5. Once the yield signal is output 404 to the display 50, the display can present information about the crop yield that an operator can see during operation. The presented crop yield may be in the form a crop yield for each individual strip 108, 110, 112 of harvested crop and/or a crop yield running average for an entirety of a field 100.

In some embodiments, the method 400 further includes setting 405 a conveyance speed of the conveyor 23 defining a time period for performing an unload cycle. Determining 402 the mass of crop material may occur at a defined frequency that is equal to the set time period to reduce the computing power needed to determine 402 the mass of crop material, as previously described. It should be appreciated that the frequency of determining 402 the mass of crop material may be varied to be different from the time period for the conveyor 23 performing an unload cycle.

It is to be understood that the steps of the method 400 are performed by the controller 40 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 40 described herein, such as the method 400, is implemented in software code or instructions which are tangibly stored on a tangible computer readable medium. The controller 40 loads the software code or instructions via a direct interface with the computer readable medium or via a wired and/or wireless network. Upon loading and executing such software code or instructions by the controller 40, the controller 40 may perform any of the functionality of the controller 40 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A merger system for an agricultural windrower, comprising:
    at least one frame mount configured to couple to a chassis;
    a frame coupled to the at least one frame mount;
    a conveyor supported by the movable merger frame, the conveyor including an endless belt configured to convey crop material in a strip on the ground;
    at least one load sensor associated with the at least one frame mount; and
    a controller operatively coupled to the at least one load sensor, the controller being configured to:
        acquire load signals from the at least one load sensor at a certain frequency regarding a load at the at least one frame mount as crop material is conveyed by the endless belt of the conveyor, wherein the certain frequency is defined based on a period of time for the conveyor to rotate half of the endless belt;
        determine a mass of the crop material conveyed by the conveyor based at least partially on the load signals;
        determine a crop yield based at least partially on the mass of crop material; and
        output a yield signal corresponding to the crop yield of the crop material deposited in the strip.

2. The merger system of claim 1, wherein the at least one frame mount comprises a plurality of frame mounts and the at least one load sensor comprises a plurality of load sensors, each of the plurality of load sensors being associated with a respective one of the plurality of frame mounts.

3. The merger system of claim 1, wherein the controller is configured to determine the crop yield also based at least partially on at least one of a ground speed of the agricultural windrower, a conveyance speed of the conveyor, or a working width of a header.

4. The merger system of claim 1, wherein the crop yield is determined for each strip in the field.

5. The merger system of claim 1, wherein the controller is configured to operatively account for the crop yield in a strip containing a double windrow or a triple windrow.

6. An agricultural windrower, comprising:
    a chassis;
    a merger system carried by the chassis, the merger system comprising:
        a frame suspended from the chassis;
        a conveyor supported by the merger frame, the conveyor including an endless belt configured to convey crop material to a strip on the ground; and
        at least one frame mount coupling the frame to the chassis;
    at least one load sensor associated with the at least one frame mount; and
    a controller operatively coupled to the at least one load sensor, the controller being configured to:
        acquire load signals from the at least one load sensor at a certain frequency regarding a load at the at least one frame mount as crop material is conveyed by the endless belt of the conveyor, wherein the certain frequency is defined based on a period of time for the conveyor to rotate half of the endless belt;
        determine a mass of the crop material conveyed by the conveyor and deposited on the ground based at least partially on the load signals;
        determine a crop yield based at least partially on the mass of the crop material; and
        output a yield signal corresponding to the crop yield of the crop material deposited in the strip on the ground.

7. The agricultural windrower of claim 6, wherein the at least one frame mount comprises a plurality of frame mounts and the at least one load sensor comprises a plurality of load sensors, each of the plurality of load sensors being associated with a respective one of the plurality of frame mounts.

8. The agricultural windrower of claim 6, wherein the controller is configured to determine the crop yield also based at least partially on at least one of a ground speed of the agricultural windrower, a conveyance speed of the conveyor, or a working width of a header.

9. The agricultural windrower of claim 6, wherein the crop yield is determined for each strip in the field.

10. The agricultural windrower of claim 6, wherein the controller is configured to operatively couple to a display and output the yield signal to the display.

11. A method of determining a yield of an agricultural windrower traveling across a field when producing double or triple windrows, the method being performed by a controller and comprising:
    when a merger system of the agricultural windrower is in a non-working position, depositing the collected crop material in first strips on the field without using a conveyor of the merger system;
    when the merger system of the agricultural windrower is in a working position:
        conveying collected crop material with the conveyor of the merger system and depositing the collected crop material in second strips on the field, the conveyor including an endless belt, one or two of the second strips being adjacent a respective one of the first strips to provide the double or triple windrows;
        acquiring signals from a sensor as the collected crop material is conveyed by the endless belt of the conveyor; and
        determining a mass of the collected crop material conveyed by the conveyor and deposited in the second strips on the field based at least partially on the signals;
    determining a crop yield based at least partially on the mass of the collected crop material of the second strips and a harvested acreage of the field to account for the collected crop material included in the first strips and the second strips; and
    outputting a yield signal corresponding to the crop yield of the collected crop material deposited in the first strips and the second strips on the field.

12. The method of claim 11, wherein the windrower comprises a plurality of frame mounts coupling the merger frame to a chassis of the windrower and a plurality of load sensors operatively coupled to the controller, each of the plurality of load sensors being associated with a respective one of the plurality of frame mounts.

13. The method of claim 11, wherein the crop yield is determined based at least partially on at least one of a ground speed of the agricultural windrower, a conveyance speed of the conveyor, or a working width of a header of the vehicle.

14. The method of claim 11, wherein the crop yield is determined for each strip in the field.

15. The method of claim 11, wherein the yield signal is output to a display.

* * * * *